Patented Dec. 11, 1951

2,577,948

UNITED STATES PATENT OFFICE 2,577,948

MANUFACTURE OF DIHYDROISOCODEINE

Manuel M. Baizer, Flushing, N. Y., assignor to New York Quinine and Chemical Works, Incorporated, Brooklyn, N. Y., a corporation of New York No Drawing. Application October 28, 1950, Serial No. 192,813

3 Claims. (Cl. 260—285)

My invention relates to the manufacture of dihydroisocodeine, hereinafter conveniently referred to as DHIC.

DHIC has previously been made by a process which involves converting codeine to alpha-chlorocodide (Small Cohen, J. A. C. S. 52, 2214, 1931) and treating the latter with acetic acid which gives a mixture of pseudocodeine, allopseudocodeine, and isocodeine. The mixture is laboriously separated into its components by means of appropriate salts, and the isocodeine is then hydrogenated and yields DHIC (Speyer and Krauss, Ann. 432, 233, 1923).

The overall yield of this method is only 22.3% of the theory based on codeine. In another experiment (Rapoport and Payne, J. Org. Chem. 15, 1097, 1950) the overall yield obtained by the same method was only 6%.

In an effort to improve the yield, I have now discovered that a far superior yield of DHIC in the order of about 60% can be obtained by a procedure which is very different from the one referred to above.

My new process involves the reduction of dihydrocodeinone with the aid of metallic alkoxides in an anhydrous organic solvent. Aluminum alkoxides are known reducing agents for carbonyl compounds but have never before been applied to keto opium alkaloids. The reduction fails with some alkaloids such as quininone and even with some simpler amino-ketones, and it usually gives mixtures of isomers which are difficult to separate. Where one of two possible epimers is favored in this reaction, the possibility of predicting the outcome is very small at present. Jackman et al. (Journ. Chem. Soc. 1949, 2642) attempted to develop a hypothesis as to which epimer would be favored. On the basis of that hypothesis, Rapoport et al. (J. Org. Chem. 15, 1103, 1950) interpreted their own data on the oxidation of dihydrocodeine and of DHIC in the Openauer reaction as indicating that dihydrocodeine and not DHIC should be the primary reduction product of dihydrocodeinone in a reaction catalyzed by metallic alkoxides.

I have found that the DHIC obtained by my new method is not admixed with any significant quantity of its epimer, dihydrocodeine; the crude dihydroisocodeine of my process yields derivatives such as the picrate and methiodide whose melting points are in good agreement with those reported in the literature.

DHIC has been extensively investigated clinically as an analgesic and antitussive agent, and with reference to its addiction liability. Whereas DHIC is rather expensive when made by the method of the prior art, it is produced by my new method in a much less expensive and more convenient manner, since the yield is greatly improved and no extensive separation and purification is required. Thus, DHIC will now be readily available for us in clinical trials.

The following examples illustrate my invention:

Example 1

A mixture of 5.00 g. dihydrocodeinone, 7.50 g. aluminum isopropoxide and 150 cc. dry toluene was heated under a reflux condenser connected to a sulfuric acid trap for 24 hours. The mixture was cooled and extracted first with 80, then with 50 and finally with 35 cc. of 10% hydrochloric acid. The acid extracts were made strongly alkaline with sodium hydroxide and extracted four times with 100 cc. each of chloroform. The chloroform extracts were washed, dried and evaporated to dryness. The residue, 4.75 g., was dissolved in 60 cc. of ethylene dichloride and passed by gravity through a column of activated alumina 6 inches high and three-quarter of an inch in diameter. The column was then washed by gravity with portions of ethylene dichloride and the effluents collected in 50 cc. fractions. The first four effluents contained a total of 1.12 g. of a mixture of dihydrocodeinone and dihydroisocodeine. The alkaloid remaining on the alumina was removed by 5% sulfuric acid. The acid solution was made alkaline and extracted with chloroform. Evaporation of the chloroform gave 3.05 g. (about 60%) of alkaloid which after recrystallization from alcohol melted at 195–198° and yielded a picrate and acetyl derivative whose melting points of 235–236° and 165–168° respectively agreed well with those reported in the literature for the corresponding derivatives of dihydroisocodeine. (Cf. Small's "Chemistry of the Opium Alkaloids" published by the U. S. Treasury Department, Public Health Service, Supplement No. 103, page 224.)

Example 2

A mixture of 5.00 g. dihydrocodeinone, 7.50 g. aluminum isopropoxide, 50 cc. dry isopropyl alcohol and 150 cc. dry toluene was heated under partial reflux with slow take-off. The distillate was tested from time to time for acetone. About 60 cc. of dry isopropanol was added dropwise in the course of the reaction to compensate for lost solvent. When no further acetone was formed in the distillate, the reaction mixture was heated to about 107° (vapor temperature) cooled and extracted first with 50, then with 20 and finally with 10 cc. of 10% HCl. The continued acid extracts were made strongly alkaline with 40% sodium hydroxide. The precipitated alkaloid was removed filtration, washed with water and dried. Yield 4.38 g. (87.6%), M. P. 180-193°. A sample after recrystallization from alcohol melted at 194-199° and gave no depression in melting point when admixed with authentic dihydroisocodeine.

The solvent employed in this reaction is an anhydrous organic liquid such as benzene and toluene selected primarily for its ability to dissolve substantial amounts of the aluminum salt of an alcohol capable of being oxidized to its carbonyl derivative. The reaction is conveniently performed at reflux temperature of the solvent and proceeds to completion within a reasonable time. The reaction conditions such as temperature, duration, relative proportions of the reactants and of the solvent, can be modified in various ways to strengthen the efficiency of the process and further increase the yields. These modifications are intended to be included in the scope of this invention and of the appended claims.

What I claim is:

1. The process of making dihydroisocodeine which comprises heating a mixture of 5.00 g. dihydrocodeinone, 7.50 g. aluminum isopropoxide, 150 cc. dry toluene under reflux with exclusion of moisture, extracting the cooled reaction mixture with 10% hydrochloric acid, adding sodium hydroxide to the extract to make it strongly alkaline, extracting it with chloroform evaporating the chloroform extract, chromatographing the residue dissolved in ethylene dichloride on activated alumina, washing the alumina with dilute sulfuric acid to remove the dihydroisocodeine therefrom, making the acid solution strongly alkaline, extracting it with chloroform and evaporating the chloroform solution to obtain the crude dihydroisocodeine.

2. In the process of reducing dihydrocodeinone to dihydroisocodeine the improvement which comprises performing the reduction with aluminum isopropoxide in an anhydrous organic solvent.

3. The improvement of claim 2 in which toluene is used as the organic solvent.

MANUEL M. BAIZER.

REFERENCES CITED

The following references are of record in the file of this patent:

Rapoport et al.: J. Org. Chem., vol. 15, pp. 1103-1107 (September 1950).